Feb. 18, 1947.  J. S. WALLIS ET AL  2,416,273
WASTE HEAT ECONOMIZER
Filed April 29, 1944   2 Sheets—Sheet 2

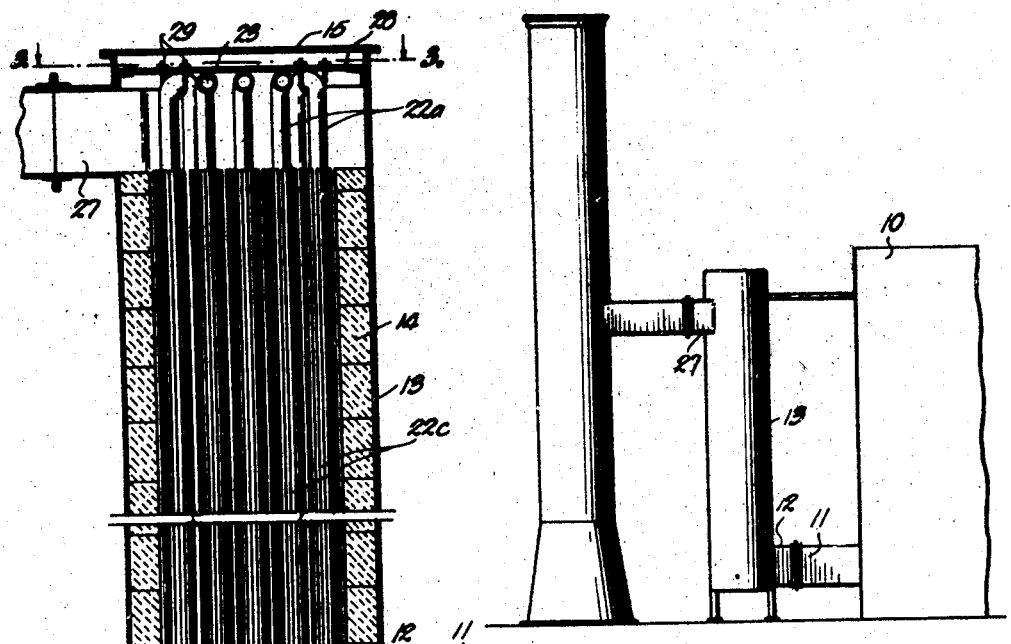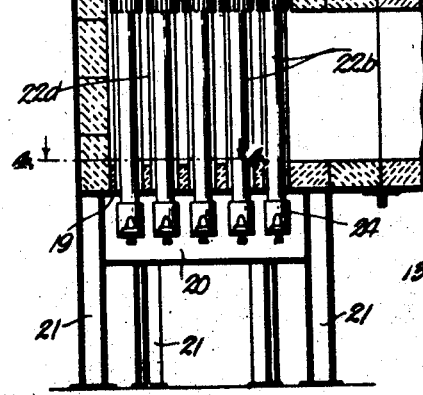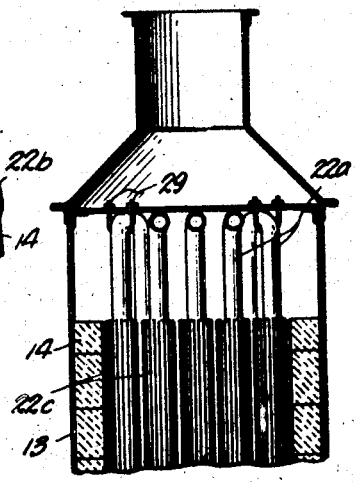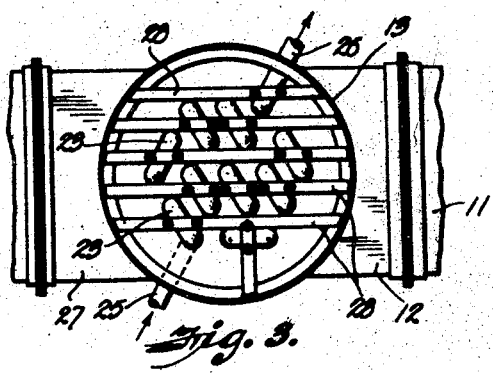

INVENTORS.
John S. Wallis
John W. Throckmorton
BY
ATTORNEY.

Patented Feb. 18, 1947

2,416,273

UNITED STATES PATENT OFFICE 2,416,273

WASTE HEAT ECONOMIZER

John S. Wallis, Darien, and John W. Throckmorton, Wilton, Conn., assignors to Petro-Chem Process Company, Incorporated, New York, N. Y., a corporation of Delaware Application April 29, 1944, Serial No. 533,420

1 Claim. (Cl. 257—223)

This invention relates to heat exchange apparatus and refers more particularly to waste heat economizers wherein flue gas or exhaust gases from which the heat has been partially spent or exhausted is utilized to heat fluids passed in heat exchange relation therewith.

Exhaust gases from internal combustion engines, furnaces of different types such as rotary retorts for the manufacture of cement, steel mill furnaces, furnaces for heating boiler water and flue gases from other sources containing varying amounts of waste heat may serve to supply the necessary waste heat to the economizer.

The novelty in the invention resides primarily in the following structural features:

1. Arrangement of the heating space and tubular heat exchange elements to produce a minimum pressure drop between the inlet and outlet ports, or a minimum back pressure to the passage of the heating gases (vertical chamber with vertical tubes and upflow of gases);

2. Utilizing extended surface on the tubes to increase heat exchange efficiencies and locating the extended surface centrally of the heater in order to expose bare surface tubes adjacent the inlet and outlet ports, thereby obtaining more even distribution of the heating gases over the exchange surface and better heat distribution.

3. Enclosing the heating chamber at the top and bottom by upper and lower tube sheets, supporting the tubes on the lower tube sheet and preventing displacement and limiting the relative movement of the tubes by guides at their upper ends for connecting the tubes by removable return bends in order that single tubes or sets of tubes may be removed through the top of the chamber without disturbing the side wall insulation.

A further object of the invention is to provide a waste heat economizer whose heat exchange surface has approximately six times the capacity of bare tubes without the surface. This gives efficient duty with a small number of tubes, effecting substantial economies in both size and weight of the structure. For example, an economizer having twenty extended surface tubes of the type shown will deliver the service of approximately one hundred bare tube heating elements and the weight of the bare tube structure would be four times as great. This low weight is of particular importance where economizers are installed in elevated positions, such as in the stacks or flues of power plants, steam ships and in other places where weight is an important factor. In certain types of catalytic cracking units the flue gas leaving the catalyst chamber may be elevated 100 feet or more and a light weight economizer naturally reduces the amount of supporting steel structure required.

Further advantages and novelty will be apparent from the following description.

In the accompanying drawings which form a part of the instant specification and are to be read in conjunction therewith, and in which like numerals are used to indicate like parts in the various views, Fig. 1 is a side elevational view of an economizer embodying the invention connected to an existing furnace and stack installation;

Fig. 2 is a vertical sectional view of the economizer shown in Fig. 1;

Fig. 3 is a view taken along the line 3—3 in Fig. 2 in the direction of the arrows;

Fig. 4 is a sectional view taken along the line 4—4 in Fig. 2 in the direction of the arrows;

Fig. 5 is a partial view of the top of an economizer such as shown in Fig. 2 with a stack or discharge flue mounted on the top;

Figure 6:
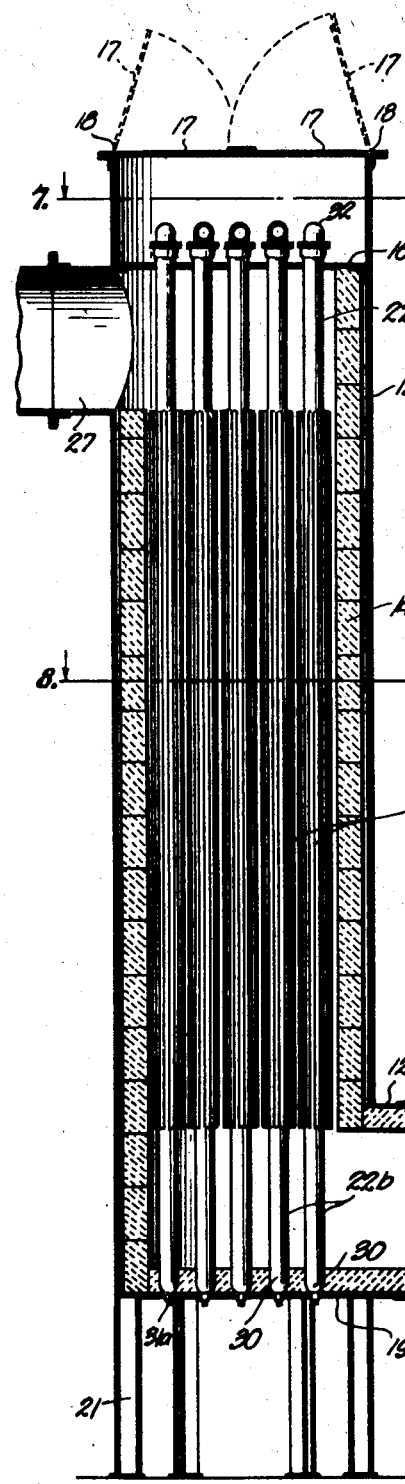
Fig. 6 is a vertical section of an economizer employing a modified type of support and guides for the tubes.
Figure 7:
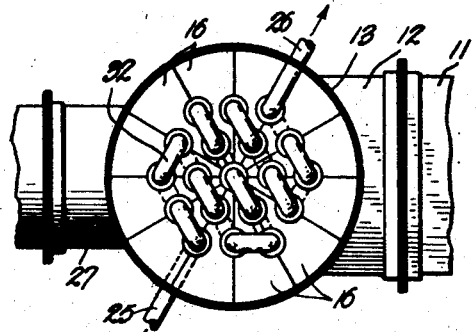
Fig. 7 is a view taken along the line 7—7 in Fig. 6 in the direction of the arrows.
Figure 8:
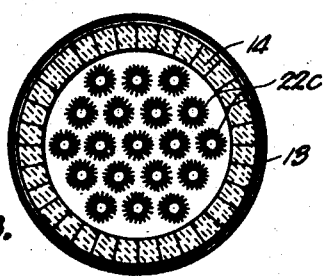
Fig. 8 is a view taken along the line 8—8 in Fig. 6 in the direction of the arrows.

Referring to the drawings and particularly to Fig. 1, at 10 is shown a diagrammatic furnace or oven having a flue gas outlet 11. This outlet flue 11 is connected to the inlet 12 of the economizer by a flanged ring shown in Fig. 2. The economizer comprises an outer sheet metal casing 13 lined with refractory material 14 capable of withstanding and resisting without substantial deterioration the flue gases passing therethrough. The heating space of the economizer shown in Fig. 2 is closed at the top by a removable cover plate 15. The heating space in the economizer shown in Fig. 6 is enclosed at the top by a tube sheet divided into a plurality of segments 16. The edges of the segments are cut out to fit the exterior surfaces of the pipes. These segments are made removable by locating the radially extending separating lines between the segments to pass through the center of the pipes which they bisect. Also in the type shown in Fig. 6 above the segmental tube sheet is an enclosure for the return bends having top doors 17 hinged or pivoted at 18 on the casing of the economizer.

At the bottom of the heating space of the economizer shown in Fig. 2 is a lower tube sheet 19 supported by a frame member 20 carried by standards or legs 21. The tubes within the economizer comprise a plurality of vertically positioned pipes 22 connected at the top by inverted U-bends 23 and at the bottom by double closure return bends 24. These double closure return bends provide cross-over connections for the tube ends providing continuous passage for the fluid through the tubes. They also have plugged openings in axial alignment with the tubes, permitting the tubes to be cleaned from below when the plugs are removed. The tubes are serially connected so that liquid introduced through pipe 25 is directed through the tubes in a continuous passage to the discharge pipe 26. The upper extremities of the tubes designated by the numeral 22a and on those portions of the tubes which lie adjacent the outlet opening 27 of the heating space are without fins. Correspondingly, those portions of the tubes designated by the numeral 22b which are adjacent the inlet opening 12 are likewise bare surfaced except for tube support members hereinafter described.

Affixed to the exterior of the tubes between the upper and lower sections without fins are the fin tube sections of the heating elements designated by the numeral 22c. The fin surface sections of the tubes are positioned centrally within the heating space of the economizer between the inlet and outlet ports. The extended surface or longitudinal fins affixed to the outer surfaces of the tubes expose a greatly enlarged surface for the transmission of heat from the heating gases to the fluid passing through the tubes. The fins are U-shape in cross section with the bases of the U-shape members welded to the tube surface forming an integral structure and one well adapted for the transmission of heat energy. Lying parallel with the tubes they offer a minimum of obstruction to the passage of the gases. One set of fins on opposite sides of the pipe are extended downwardly from the fin tube section to the lower tube sheet as shown in Figs. 2 and 4. These fins are numbered 22d and are shown in cross section in Fig. 4. Their lower ends seat upon the tube sheet 19 and serve as a support for the individual tubes. Being positioned on opposite sides of the tubes and in alignment with the passage of the gases entering through inlet 12 they offer a minimum resistance to the gas flow.

In order to hold the tubular heating elements in spaced relation and prevent displacement due to warping or uneven heating, the upper inverted U-bends 23 are hung upon cross strips or channels 28 by means of U-shaped hanger bolts 29.

Figure 9:
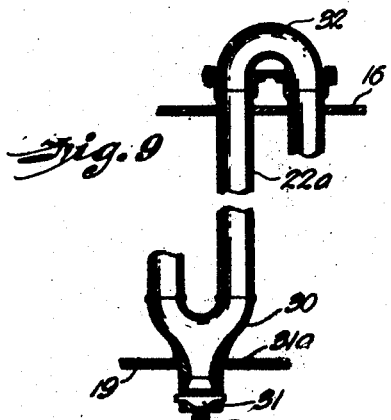
Fig. 9 is an enlarged detail of the tube supports and tube guides used in the economizer shown in Fig. 6.

In the modified construction shown in Figs. 6 to 9, inclusive, the double closure return bends at the bottom of the tubes have been replaced with Y-type headers 30 shown in Fig. 9, having a single closure plug 31. A shoulder 31a formed in the header near its bottom seats upon the lower tube sheet 19 to support the weight of each pair of tubes to which it is connected. The upper ends of the adjoining tubes in this modification are connected by a removable return bend 32 shown in detail in Fig. 9. In operation both types of economizers function the same. Waste heat gases are introduced through flue 11 and inlet 12. Due to the plain surface sections of the lower extremities of the tubes without fins the gases are permitted to uniformly distribute themselves throughout the lower portion of the economizer. The gas passage is thence upwardly along the channels formed by the fins surrounding the tubes where the greater part of the heat is transmitted from the gases to the fluid within the tubes. In their passage from the bottom to the top of the economizer there is but little pressure drop due to the low friction resistance caused by the absence of any baffles and no changes in the direction of the flow of the flue gas. It will be noted that horizontal baffles have been entirely dispensed with, the magnitude of the surface exposed being relied upon to extract the principal part of usable heat from the gases. At the top of the economizer and opposite the outlet duct 27 the tubes are again without fin surfaces corresponding to the space opposite the inlet port permitting free discharge of the gases through the outlet opening with a minimum of resistance afforded by the tube surface.

In both types of economizers the tubes can be easily removed from the heating chamber without disturbing the insulation or refractory lining except such refractory material as may surround the lower ends of the tubes above the tube sheet.

To remove the tubes from the economizer shown in Fig. 2 it is only necessary to remove the lower double closure return bends 24, take off the top cover plate 15, remove the top hangers and supporting strips and raise the tubes from the chamber.

To remove tubes from the economizer shown in Fig. 6 the top doors 17 are opened, the upper segmental tube sheet 16 is removed and one or more of the return bends 32 taken from the pipes. This permits the tubes to be raised vertically from the heating chamber if the lower plugs 31 have been previously taken out of the bottom headers. Likewise in cleaning the tubes in the economizer shown in Fig. 6 the U-bends at the top are removed, the lower plugs are taken out and the tubes readily cleaned from above. In cleaning the tubes of the economizer shown in Fig. 2 the plugs are removed from the lower return bends and a cleaner inserted from below. The tube cleaners are sufficiently flexible to remove accumulated material from the top return bends when the tubes are cleaned from below.

Although the description of the economizer has been based on utilizing fin tube extended surfaces, it is contemplated as well to use other types of extended surface such as spiral fins, pin type surface or any type of extended surface which is bonded integrally to the heating element. Furthermore, although the drawings shown have been based on a series flow through the heating elements, it is contemplated that the heater arrangement may be modified so that either series or multi-pass flow may be utilized, depending upon the quantity of the product being treated and the pressure drop requirements.

From the foregoing it will be seen that the invention is well adapted to attain all of the ends and objects hereinbefore set forth together with other advantages which are obvious and which are inherent to the structure. As many possible embodiments may be made of the invention without departing from the scope thereof, it is understood that all matter herein set forth or shown in the accompanying drawings is to be interpreted as illustrative and not in a limiting sense.

Having thus described our invention, we claim:

A waste heat economizer comprising a vertical chamber, a plurality of vertical tubes connected in series within the chamber to form a continuous passageway for fluid to be heated, heating gas inlet and outlet ports in the chamber, a lower tube sheet supporting the tubes, longitudinal fins on the tubes intermediate the inlet and outlet parts serving to increase their heat exchange surface and spacer members engaging the tubes adjacent their upper portions to hold them in spaced relation with respect to each other and in position in the heating chamber.

JOHN S. WALLIS.
JOHN W. THROCKMORTON.

REFERENCES CITED

The following references are of record in the file of this patent:

UNITED STATES PATENTS

| Number | Name | Date |
|---|---|---|
| 1,884,777 | Lucke | Oct. 25, 1932 |
| 1,920,800 | McCausland | Aug. 1, 1933 |
| 1,989,612 | De Florez | Jan. 29, 1935 |
| 2,081,970 | Alther | June 1, 1937 |
| 2,276,529 | Throckmorton | Mar. 17, 1942 |

FOREIGN PATENTS

| Number | Country | Date |
|---|---|---|
| 455,710 | German | Feb. 10, 1928 |